March 22, 1966 A. SIMON 3,242,482
PHOTOCONDUCTOR MEANS FOR INDICATOR DEVICE
Filed April 15, 1963

INVENTOR.
ARTHUR SIMON
BY *Herbert L. Davis*
ATTORNEY

United States Patent Office 3,242,482
Patented Mar. 22, 1966

3,242,482
PHOTOCONDUCTOR MEANS FOR
INDICATOR DEVICE
Arthur Simon, Fair Lawn, N.J., assignor to The Bendix
Corporation, Teterboro, N.J., a corporation of
Delaware
Filed Apr. 15, 1963, Ser. No. 273,237
3 Claims. (Cl. 340—378)

This invention relates to a photoconductor means for an indicator device and more particularly to photoconductive means for effecting a signal from a light source carried by a movable indicator.

There has been found a need to have an actuating signal obtained from a movable output member of an indicator, and therefore, an object of the invention is to provide in such a device means including photoconductor segments, a light source carried by the indicator or output member in its movement in cooperation with the photoconductor segments as well as the provision of electroluminescent segments cooperating with the photoconductors to illuminate indicia with which the indicator pointer is cooperatively arranged.

In the aforenoted arrangement, the electroluminscent segments may be of a conventional type having thin films of a phosphor material sandwiched or immediately positioned between two electrical conductor layers, one or both of which may be transparent. In such arrangement, application of varying voltage to the outer conductor layers will, under proper conditions, cause the phosphor material to emit light, the complete explanation of this phenomenon is probably not fully understood at this time. Further, these electroluminescent film type elements may be utilized with similar film type elements having the properties of photoconductors in a novel indicator arrangement and in a field commonly understood as EL-PC (electroluminescent-photoconductor circuitry), as explained in a copending application Serial No. 254,373, filed January 28, 1963, by Frederick Blancke Sylvander, and assigned to The Bendix Corporation, assignee of the present application.

Another object of the invention is to provide a driven element in which an actuating signal is obtained from the light source carried by the movable output member of the indicator.

Another object of the invention is to provide in such an indicator device an element in which there is provided a network of resistors and photoconductor elements in a logical arrangement to yield position information by a voltage divider action.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is therefore to be had to the appended claims for this purpose.

Figure 2:
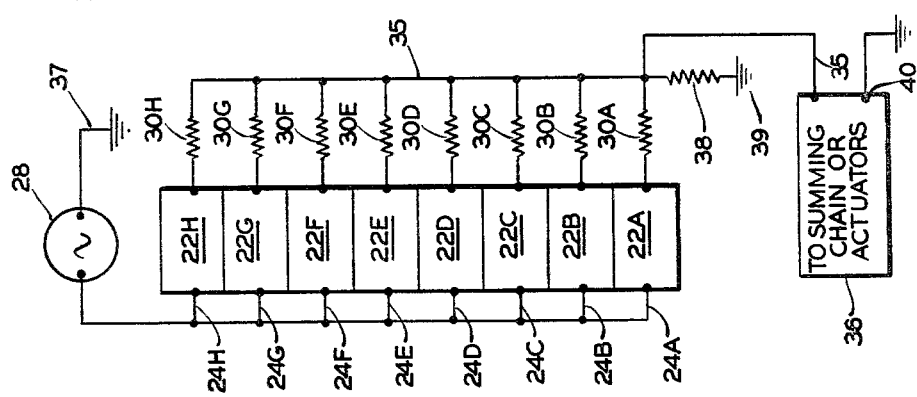
FIGURE 2 is a schematic circuit diagram of a photoconductor means for use in the indicator of FIGURE 1.
Figure 1:
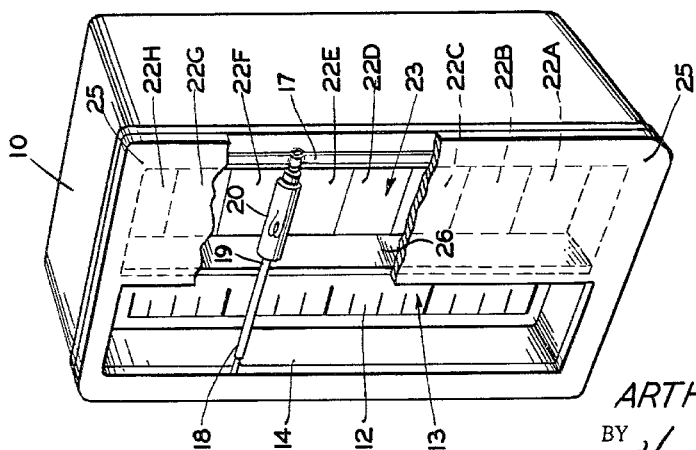
FIGURE 1 is a front plan perspective view of an indicator embodying the invention with a portion of an external light shield broken away to show the light source carried by a movable indicator member in cooperative relation with photoconductor segments.

Referring to the drawings of FIGURES 1 and 2, there is indicated by the numeral 10 an indicator casing in which there may be provided suitable indicia 12 in a chamber 13 which may be viewed through an opening 14 in the casing and may be arranged in cooperative relation with a suitable movable indicator pointer 18 adjustably positioned in the chamber 13 relative to the indicia 12 so as to provide the desired indicator function.

The indicator pointer 18 may be adjusted longitudinally in the indicator casing 10 by suitable motor means, not shown, connected such as for example by an adjustable tape 17 or tape of a type described and claimed in the copending U.S. application Serial No. 67,843, filed November 7, 1960, by Wliliam F. Watson. The operating mechanism for the pointer 18, however, may be of any suitable type.

The pointer 18 has an arm portion 19 on which there is mounted a suitable light source 20 which may be an electric lamp energized through suitable electrical conductors, not shown. The light source 20 is arranged in cooperative relation with a series of photoconductor segments indicated by the numerals 22A, 22B, 22C, 22D, 22E, 22F, 22G, and 22H, mounted in a chamber 23 separated from the chamber 13 by a light shield 26. A plate 25 covers the chamber 23 as an external light shield. A part of the plate 25 has been broken away so as to better show the interior of the chamber 23.

Figure 3:
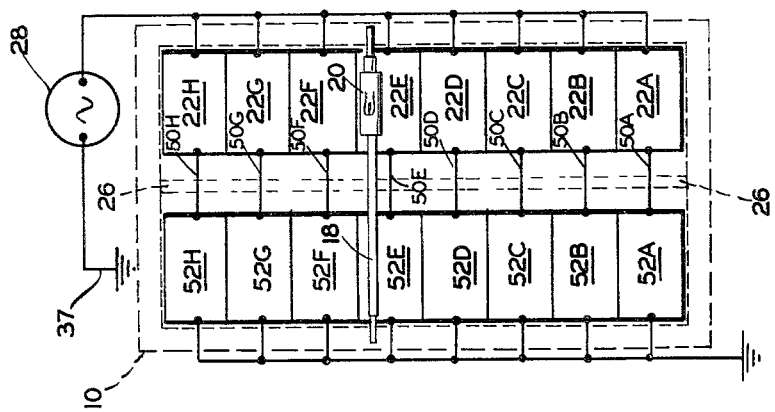
FIGURE 3 is a schematic circuit diagram of an alternate form of photoconductor means for cooperation with electroluminescent segments for illuminating indicia in the indicator device of FIGURE 1.

As shown in FIGURE 2, the photoconductor segments 22A, 22B, 22C, 22D, 22E, 22F, 22G, and 22H are electrically energized through conductors 24A–24H leading from a source of electrical energy 28 which may be a suitable source of alternating current or direct current depending upon the materials used in the photoconductor segments of FIGURE 2 and electroluminescent segments of FIGURE 3.

The serially arranged photoconductor segments 22A–22H are rendered conductive by the direction of light rays thereon by the light source or lamp 20 and this action is in turn fed back through the network of resistors 30A, 30B, 30C, 30D, 30E, 30F, 30G, and 30H to a common conductor 35 leading to an input of a suitable summing chain or actuator 36. The opposite terminal of the source of electrical energy 28 is connected to a ground at 37 while the conductor 35 is connected through a common resistor 38 to a ground 39. The other input of the summing chain or actuator 36 is grounded at 40.

In the form of the invention illustrated in FIGURE 3, the photoconductor elements 22A–22H are electrically connected through conductors 50A–50H to corresponding electroluminescent segments 52A–52H which, when energized, may shine light immediately in back of the indicator pointer 18 and indicia 12. Thus, the electroluminescent segments 52A–52H may be sequentially lighted upon the light from the lamp 20 shining on the photoconductor elements 22A–22H so as to constitute suitable display means cooperating with the indicator pointer 18 in its movement over the indicia 12 of FIGURE 1 so that the indicated condition may be more clearly shown.

In the drawing of FIGURE 1, the external light shield 25 is arranged to shield the photoconductor elements 22A–22H from the view of the observer. This shield indicated by the numeral 25 has been broken away in the view of FIGURE 1 so that the photoconductor segments 22A–22H may be more clearly shown. Further, there is provided an additional light shield 26, as shown in FIGURE 1, to shield the indicia 12 from the rays of the light source 20.

It will be seen from the arrangement of FIGURE 3 that the respective photoconductor segments 22A–22H are interconnected with the electroluminescent segments 52A–52H so that the energization of each electroluminescent segment is controlled by the photoconductor segment electrically connected thereto through the conductors 50A–50H and the photoconductor segments are rendered selectively conductive by the direction of light rays thereon from the light source 20 carried by the indicator pointer 18 as the same move along the indicia 12.

Although only two embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In a condition indicator including indicia, a movable member positionable adjacent said indicia, means for moving the movable member adjacent the indicia, a source of light carried by the movable member, a plurality of photoconductor segments positioned side by side and operable by said light source, said movable member positioning said light source successively adjacent said photoconductor segments for sequentially applying and effecting an electrical output signal, and means for shielding the photoconductor segments from external sources of light.

2. The combination defined by claim 1 including electroluminescent segments adjacent said indicia and the movable member and electrically controlled by the electrical signal for sequentially electroluminating the indicia with the position of the movable member.

3. The combination comprising a movable member, means for moving the movable member, a source of light carried by the movable member, a plurality of photoconductor segments positioned side by side and operable by said light source, said movable member positioning said light source successively adjacent said photoconductor segments for sequentially applying and effecting an electrical output signal, means for shielding said photoconductor segments from external sources of light, a resistor network operable with the photoconductor segments and a summing means operable for providing a voltage divider action for effecting the electrical output signal depending on the adjusted position of the movable member by said first mentioned means.

References Cited by the Examiner

UNITED STATES PATENTS

| | | | |
|---|---|---|---|
| 1,896,784 | 2/1933 | Morton | 340—21 |
| 2,258,369 | 10/1941 | Stevenson. | |
| 2,656,106 | 10/1953 | Stabler | 340—271 |
| 2,788,519 | 4/1957 | Caldwell | 340—271 |
| 3,143,653 | 8/1964 | Adams et al. | |

OTHER REFERENCES

Publication: IBM, Character Generator Glow Lamp, vol. No. 2, August 1958.

NEIL C. READ, *Primary Examiner.*